US009253468B2

(12) United States Patent
Li et al.

(10) Patent No.: US 9,253,468 B2
(45) Date of Patent: Feb. 2, 2016

(54) THREE-DIMENSIONAL (3D) USER INTERFACE METHOD AND SYSTEM

(71) Applicant: SuperD Co. Ltd., Shenzhen (CN)

(72) Inventors: Xiaoming Li, Shenzhen (CN); Lei Song, Shenzhen (CN); Ning Liu, Shenzhen (CN); Zhang Ge, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 434 days.

(21) Appl. No.: 13/629,640

(22) Filed: Sep. 28, 2012

(65) Prior Publication Data

US 2013/0083024 A1  Apr. 4, 2013

(30) Foreign Application Priority Data

Sep. 29, 2011  (CN) .......................... 2011 1 0302300

(51) Int. Cl.
| | |
|---|---|
| *G06T 19/00* | (2011.01) |
| *G06F 3/041* | (2006.01) |
| *G06F 3/048* | (2013.01) |
| *H04N 13/02* | (2006.01) |
| *H04N 13/00* | (2006.01) |
| *H04N 13/04* | (2006.01) |

(52) U.S. Cl.
CPC ......... *H04N 13/007* (2013.01); *H04N 13/0292* (2013.01); *H04N 13/0456* (2013.01)

(58) Field of Classification Search
CPC ....... G06T 19/00; G06F 3/0418; G06F 3/048; H04N 13/0239; H04N 13/0055
USPC .................... 345/419, 178; 348/42
See application file for complete search history.

(56) References Cited

U.S. PATENT DOCUMENTS

| | | | | |
|---|---|---|---|---|
| 7,463,257 | B2 * | 12/2008 | Martin .......................... | 345/419 |
| 2002/0067466 | A1 * | 6/2002 | Covannon et al. ............... | 353/8 |
| 2011/0187706 | A1 * | 8/2011 | Vesely et al. .................. | 345/419 |
| 2012/0019524 | A1 * | 1/2012 | Nobori .......................... | 345/419 |
| 2012/0086714 | A1 * | 4/2012 | Yeon et al. .................... | 345/419 |

FOREIGN PATENT DOCUMENTS

| | | |
|---|---|---|
| CN | 102056002 A | 5/2011 |
| CN | 102147703 A | 8/2011 |
| WO | 2009/140908 A1 | 11/2009 |

* cited by examiner

*Primary Examiner* — Matthew D Salvucci
(74) *Attorney, Agent, or Firm* — Anova Law Group, PLLC

(57) ABSTRACT

A method is provided for a three-dimensional (3D) user interface (UI) display system. The method includes providing a 3D image containing a plurality of objects and having at least a first image and a second image and displaying the 3D image as a 3D display scene. The method also includes determining a UI in the 3D display scene to be configured, determining individual parallax of the plurality of the objects in the 3D display scene, and configuring the UI based on the parallax of the plurality of objects in the 3D display scene.

15 Claims, 4 Drawing Sheets

THREE-DIMENSIONAL (3D) USER INTERFACE METHOD AND SYSTEM

CROSS-REFERENCES TO RELATED APPLICATIONS

This application claims the priority of Chinese patent application number 201110302300.1, filed on Sep. 29, 2011, the entire contents of which are incorporated herein by reference.

FIELD OF THE INVENTION

The present invention generally relates to 3D technologies and, more particularly, to the methods and systems for improved 3D user interface display.

BACKGROUND

Using 3D technologies, a user interface (UI) can create a link between the real world and the virtual three-dimensional space and allows the user to interact directly with the displayed contents. Thus, when the user is using a device equipped with a 3D UI, the user can have a 3D viewing experience closer to the real-world experience.

However, with existing 3D technologies, most UIs in the scene of displayed contents are limited by their spatial locations, therefore affecting the presentation of the 3D contents. The user may often have an undesired viewing experience. The disclosed methods and systems are directed to solve one or more problems set forth above and other problems.

BRIEF SUMMARY OF THE DISCLOSURE

One aspect of the present disclosure includes a method for a three-dimensional (3D) user interface (UI) display system. The method includes providing a 3D image containing a plurality of objects and having at least a first image and a second image and displaying the 3D image as a 3D display scene. The method also includes determining a UI in the 3D display scene to be configured, determining individual parallax of the plurality of the objects in the 3D display scene, and configuring the UI based on the parallax of the plurality of objects in the 3D display scene.

Another aspect of the present disclosure includes a 3D UI display system. The display system includes a display and a processor. The display is configured to display as a 3D display scene a 3D image containing a plurality of objects and having at least a first image and a second image. The processor is configured to determine a UI in the 3D display scene to be configured, to determine individual parallax of the plurality of the objects in the 3D display scene, and to configure the UI based on the parallax of the plurality of objects in the 3D display scene.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 6:
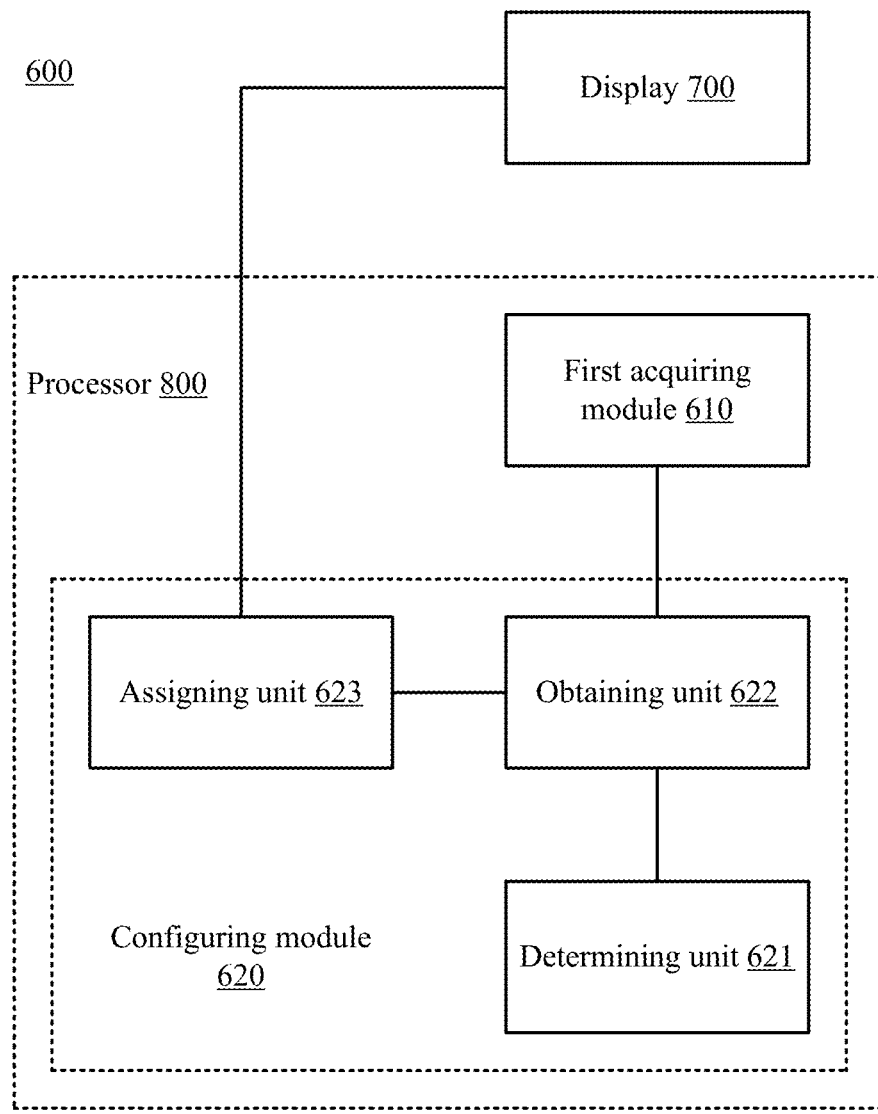
FIG. 6 illustrates an exemplary 3D UI display system consistent with the disclosed embodiments.

FIG. 6 illustrates an exemplary 3D UI display system 600. As shown in FIG. 6, the display system 600 includes a display 700 and a processor 800. Other modules may also be included.

The display system 600 may include any appropriate device with certain 3D display capability, such as computers, TVs, tablets, smart phones and other mobile devices, etc. Display 700 may include any appropriate type of display screen based on plasma display panel (PDP) display, field emission display (FED), cathode ray tube (CRT) display, liquid crystal display (LCD), organic light emitting diode (OLED) display, or other types of displays. Further, the display 700 may also be touch-sensitive, i.e., a touch screen. Other display types may also be used.

The processor 800 may be configured to control operation of the display system 600 and/or the user interface (UI) operations of the display system 600 and may be coincide with, for example, a control module in a computer, TV, tablet, smart phone, or other mobile device. The processor 800 may include any appropriate devices, such as a general central processing unit (CPU) or digital signal processor (DSP) processor together with other devices such as random access memory (RAM), read-only memory (ROM), input/output interfaces, sensor driving circuitry, communication interfaces, and storage/database, etc. During operation, computer programs stored in the memory or other storage devices may be executed by the processor to perform certain processes and/or to implement certain functional modules.

In certain embodiments, the display system 600 (e.g., processor 800) may perform a process to provide an improved 3D UI for interacting with a user(s) of the display system 600. The term UI (user interface), as used herein, may refer to any viewable object(s) including but not limited to: photos, icons, shortcuts, labels, avatars, virtual characters, virtual doll, virtual tools (such as virtual wrenches, virtual shovels, virtual electricity detection pens, etc.), virtual actions, characters, symbols, or any other visual contents.

Figure 1:
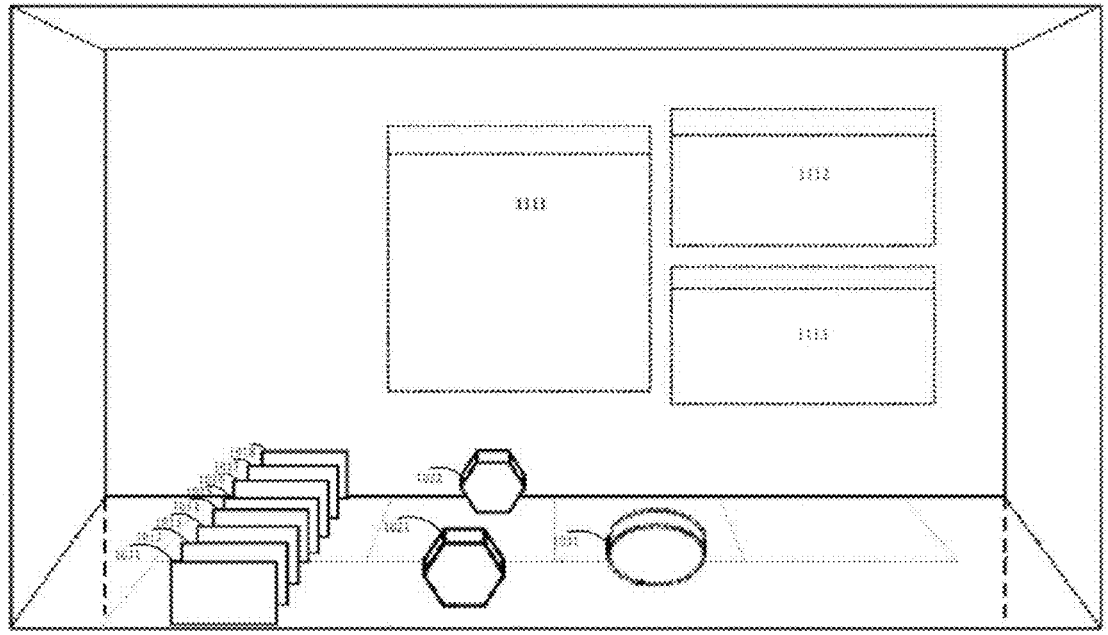
FIG. 1 illustrates a 3D display scene with certain 2D and 3D objects consistent with the disclosed embodiments.

The UI includes both two-dimensional (2D) UIs and three-dimensional (3D) UIs. A 2D UI is located on a plane, and the plane for a 3D UI is the plane closest to the display screen displaying the 3D UI. UIs and other 2D and 3D objects are displayed together on the display screen. FIG. 1 shows a 3D display scene with certain 2D and 3D objects.

As shown in FIG. 1, a 3D image is displayed as the 3D display scene. The 3D image includes a plurality of 2D objects 1011, 1012, ..., 1018 are located on separate planes, each appears gradually farther away from the viewer, i.e., further recessed from the display screen. The 3D image also includes 2D objects 1111, 1112, and 1113 located on a same plane at the farthest distance. Further, 3D objects 1021 and 1022 (i.e., two hexagonal prisms) are also located on separate planes and with different recessions from the display screen. A cylinder object 1031 is also located on the plane different from planes of other 3D UIs. Each plane may have a depth, which may affect the perception of the viewer on the objects of the 3D image displayed on the display screen. A UI can be added to the 3D scene during a user interaction, such as a mouse pointer, or a UI may exist in the original 3D scene, such as any of the 2D or 3D object or other UIs including buttons. Further, the UI may be activated by a user action, such as clicking the buttons.

Depending on particular 3D technologies, the 3D image may include different sets of images separated by certain parallax. For illustrative purposes, the 3D image may include a first image and a second image, where a parallax exits between an object in the first image and the corresponding object in the second image. Any appropriate number of images may be included in the 3D image. Further, each object or pixel in the 3D image may have a parallax.

Figure 2:
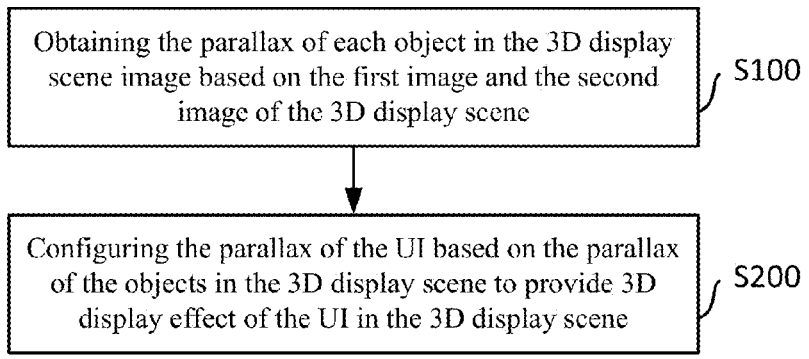
FIG. 2 illustrates an exemplary UI operation process consistent with the disclosed embodiments.

Returning to FIG. 7, during operation, processor 800 may perform certain processes to provide desired UI display and interactions. FIG. 2 illustrates an exemplary UI operation process. As shown in FIG. 2, at the beginning of the UI operation process, a 3D image is provided, and the parallax information of objects in the 3D image is determined (S100). More particularly, based on the first image and the second image of the 3D image of the 3D display scene, parallax of each object in the 3D display scene is obtained (S100).

Figure 3A:
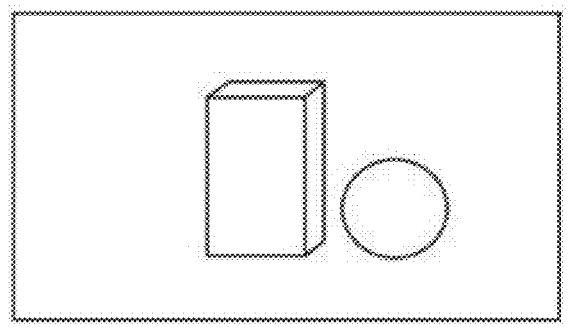
FIGS. 3A and 3B illustrate an object in the first image and the second image of a 3D image consistent with the disclosed embodiments.
Figure 3B:
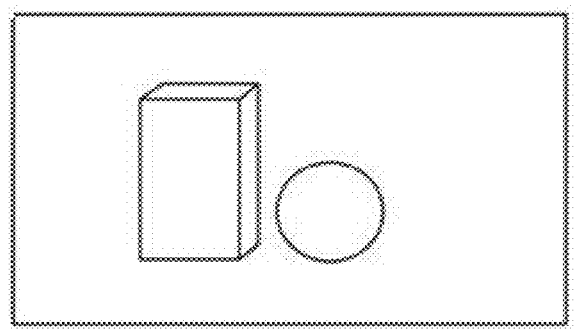
Figure 4:
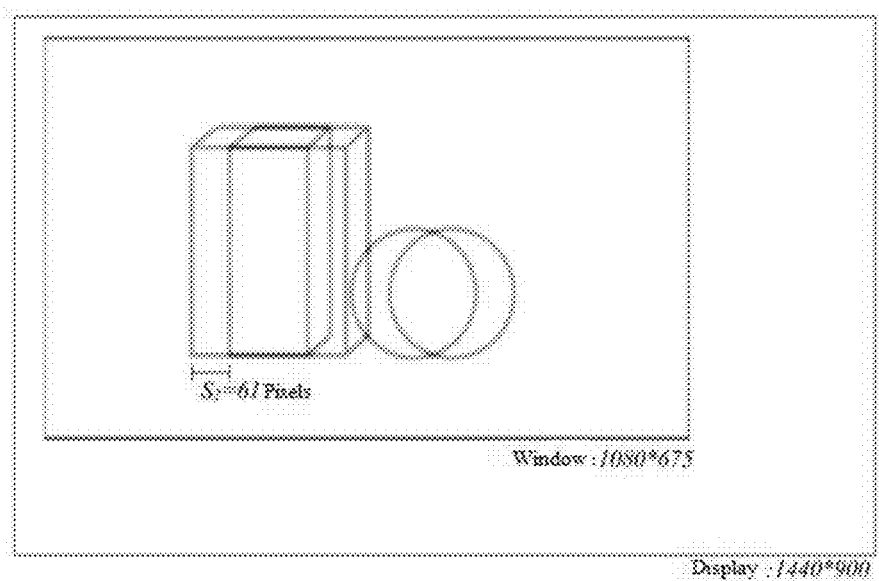
FIG. 4 illustrates an exemplary parallax calculation consistent with the disclosed embodiments.

FIGS. 3A and 3B illustrate an object or a set of objects in the first image (e.g., a left image) and the second image (e.g., a right image) of a 3D image. As shown in FIGS. 3A and 3B, certain differences exist between coordinates of the object or set of objects in the first image and the second image. Such difference may be calculated for each object in the 3D image to determine the parallax of each object in the 3D image. FIG. 4 illustrates an exemplary parallax calculation.

As shown in FIG. 4, for a display screen having a 1440×900 resolution (i.e., 1440 pixels horizontally and 900 pixels vertically), a display window of a size of 1080×675 is used to display the 3D image. The parallax between the object in the first image and the object in the second image is 61 pixels. Other resolutions, window size, and parallax values may also be used.

Figure 5:
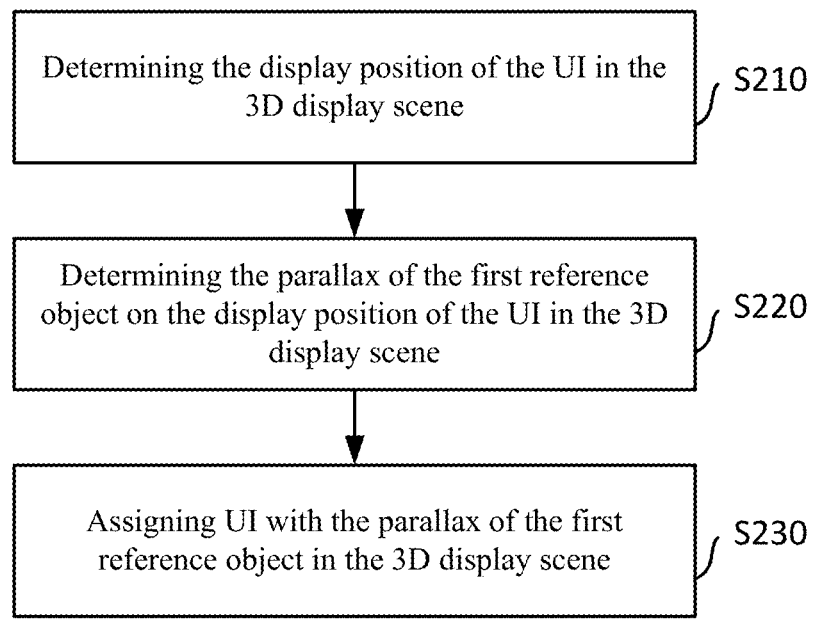
FIG. 5 illustrates an exemplary UI parallax configuration process consistent with the disclosed embodiments.

Returning to FIG. 2, after the parallax of each object in the 3D image is determined (S100), the UIs are configured based on the parallax of the objects (S200). FIG. 5 illustrates an exemplary UI parallax configuration process.

As shown in FIG. 5, the UI to be configured is first determined and the display position of the UI to be configured in the 3D image is also determined (S210). A first reference object is selected based on the display position of the UI, and the parallax of the first reference object is also determined based on the parallax of the objects in the 3D image (S220).

The first object may be selected based on certain criteria. For example, the first object may be selected based on the distance between the display position of the UI and any of the object in the 3D display scene. If the UI is located on a particular object, the particular object may be selected as the first reference object, or an object closest to the display position of the UI may be selected as the first reference object.

Further, the parallax of the UI is set to the parallax of the first reference object (S230). Thus, the UI and the first reference object of the 3D display scene may have the same spatial display position and the same parallax. When the display position of the UI in the 3D display scene changes (e.g., a different 3D image is displayed), the parallax of the UI also changes accordingly. For example, a new first reference object may be selected in a different 3D image for the UI display. The 3D effects of the UI in the 3D display scene can be achieved.

For example, for the 3D scene shown in FIG. 1, when the UI display position is determined at any of the first plane 1011 to the eighth plane 1018, the UI has the same parallax as the particular plane. When the UI display position is determined at the first three-dimensional object 1021 or the second three-dimensional object 1022, the UI has the parallax corresponding to the three-dimensional object. Further, when the UI display position is determined at the cylinder 1031, the UI has the same parallax as the cylinder 1031. Also, as shown in FIG. 4, when the UI is placed on the hexagonal cylinder, the UI is assigned with the cylinder's parallax of 61 pixels.

After the parallax of the UI is configured, the UI is displayed on the display screen. The user may choose to active the UI or the 3D display scene (with or without the UI) may change. If the 3D display scene changes, the parallax of the UI may be reconfigured according to the changed 3D display or the changed 3D image, and also displayed accordingly. If the user activates the UI, the UI may also be displayed in a way reflecting the activation of the UI by the user.

In certain embodiments, the UI may be displayed based on certain display rules. For example, when the UI is not activated, the UI can be displayed based on a predetermined first display rule. However, after the UI is activated, the UI can be displayed based on a predetermined second display rule, different from the first display rule. The second display rule may include any one or more of a group of display parameters, such as measured temperature, date, time, location, user interaction, entered messages or advertisement, presentation media items, in connection with an external device, communication with the external device, and an incoming telephone call, etc.

For instance, in one application, the second display rule includes the date and time information, as well as the temperature of the device's environment. When the UI is displayed, the display may reflect certain information of the date and time information, as well as the temperature of the device's environment. For example, in summer outdoor, the UI may be displayed in a fire red color to reflect the current season and the environment, or the UI may be displayed in a blue color to smooth the mood of the user.

In another application, the second display rule may include connection to an external device and communication with an external device. For example, when the device is connected to an external mobile phone and transmitting data to the external mobile phone, a UI can be displayed dynamically at the symbol representing the connection of the device and the mobile phone, and an arrow may be displayed to indicate the direction of the data.

Further, the first display rule may include certain display formats that the human eyes may be unable to perceive, while the second display rule may include certain display formats that the human eyes can perceive. The display formats that the human eyes may be unable to perceive includes transparent display or non-display. The display formats that the human eyes can perceive include non-transparent display, etc.

More specifically, the first display rule includes at least one of melting, dissolving, spraying, absorbing, boiling, exploding, burning, chemical reaction, falling, flying down, flying away, sunset, fading, wind blowing, evaporation, submerging, erasing, and smearing. The second display rule includes at least one of spraying, drawing, smoke, exploding, burning, chemical reaction, raining, snowing, sunrise, growing longer, growing taller, getting strong, and punctured.

Further, the color of the UI may be set to a color different from the object at the display position of the UI such that the UI can be distinguished from the object displayed at the same position and the user can easily activate the UI.

In addition, when the user operates a UI in the 3D display scene, the user may use an input device, such as a touching pen or fingers, for entering information. For example, when the user maintain a gesture for a sufficient amount of time in front of the display screen, the position detection device (e.g., a camera or infrared detector) around the display screen or at the bottom of the display screen may obtain the spatial coordinates (x1, y1, z1) of the finger making the gesture (i.e., the input object). Based on the spatial coordinates, a corresponding spatial position in the 3D display scene with the coordinate (x1, y1, z1) can be determined, and a second reference object at this position or closest to this position may also be determined. The parallax of the second reference object may then be assigned as the parallax of the UI.

Because the parallax of the second reference is assigned to the UI, the spatial coordinates (x1, y1, z1) is located on the second reference object's parallax plane closest to the display screen, generating a display effect that the UI is attached to the virtual object having the same parallax. When the UI position changes, the parallax assigned to the UI also changes. Thus, the user can perceive the different parallax of the UI when the UI changes position, and the 3D scene viewing experience may be more realistic.

Further, the parallax of the UI may be set based on other factors, in addition to the first reference object and/or the second reference object. For example, instead of assigning the parallax of the first reference object to the UI, the parallax of the objects in the 3D display scene is compared and the maximum parallax of the objects is assigned to the UI. Thus, the UI can be displayed at the farthest position from the user in the 3D display scene, which may cause the least amount of impact when the parallax of the 3D display scene changes (e.g., in a moving picture sequence).

For example, as shown in FIG. 1, the three planes 1111, 1112, and the 1113 have the maximum parallax in the 3D display scene. When the 3D display scene changes, the UI may be placed on any of these planes and with the maximum parallax so as not to affect the display effects of the 3D display scene.

Alternatively and/or optionally, after comparing the parallax of the objects in the 3D display scene, a minimum parallax is determined among the objects. The minimum parallax is then assigned to the UI. Thus, during the 3D display scene change, the UI can be displayed at a position closest to the user such that the user can easily activate the UI.

Returning to FIG. 7, the processor 800 may implement various modules and units for implementing the processes and functions described above in hardware, software, or a combination of hardware and software. As shown in FIG. 7, the processor 800 may include a first acquiring module 610 and a configuring module 620. Other modules may also be included. Further, the configuring module 620 includes a determining unit 621, an obtaining unit 622, and an assigning unit 623.

The first acquisition module 610 is configured to obtain parallax information of the objects in the 3D display scene based on the first image and the second image of the 3D display scene. The configuring module 620 is coupled to the first acquisition module 610 and is used for configuring the UI based on the parallax of the objects in the 3D display scene. More specifically, the configuring module 620 may include the determining unit 621, the obtaining unit 622, and the assigning unit 623.

The determining unit 621 is configured to determine a display position of the UI in the 3D display scene. The obtaining unit 622 is coupled to the determining unit 621 and the first acquiring module 610, and is configured to obtain the parallax of the first reference object in the 3D display scene. Further, the assignment unit 623 is coupled to the obtaining unit 622 and configured to assign the parallax of the first reference object in the 3D display scene to the UI.

Optionally and/or additionally, the configuring module 620 may also include a comparing unit (not shown) and a setting unit (not shown). The comparing unit is configured to compare the parallax of the objects in the 3D display scene, and the setting unit is configured to set a maximum parallax and/or a minimum parallax of the objects of the 3D display scene to the UI, based on the comparison results of the comparing unit.

In certain embodiments, the processor 800 may also include a second acquiring module (not shown) and a third acquiring module (not shown). The second acquiring module is configured to obtain spatial coordinates of the position of the input object operating the UI in the 3D display scene, and the third acquiring module is configured to obtain a second reference object located at the position with the obtained spatial coordinates in the 3D display scene. The configuring module 620 may configure the parallax of the UI based on the parallax of the second reference object in the 3D display scene.

By using the disclosed systems and methods, certain disadvantages of UI application based on existing 3D technologies may be overcome. The disclosed systems and methods may place the UI on virtual 2D or 3D objects to improve the visual effects of UI operations by the user, and to make the user interactive experience more realistic. Further, the position of the UI can be adjusted based on the position of different objects in the 3D display scene. The UI can be placed at the foremost position or the rearmost position, providing great flexibilities for presenting the UI according to the user's convenience. Other advantageous applications, modifications, substitutions, improvements are also obvious to those skilled in the art.

What is claimed is:

1. A method for a three-dimensional (3D) user interface (UI) display system, comprising:
    providing a 3D image containing a plurality of objects and having at least a first image and a second image;
    displaying the 3D image as a 3D display scene by the plurality of objects;
    determining a UI, independent and separate from the plurality of objects and for interacting with a user for inputting information, in the 3D display scene to be configured at a display position for the UI;
    determining individual parallax of the plurality of the objects in the 3D display scene; and
    configuring the UI at the display position for the UI with a parallax determined based on the individual parallax of the plurality of objects in the 3D display scene to correspond to at least one selected object from the plurality of objects by:
    determining the display position of the UI to be configured;
    selecting a first reference object from the plurality of objects having a same position with the display position of the UI as the selected object; and
    configuring the parallax of the UI as the same as the parallax of the first reference object such that the UI has the same display position and the same parallax as the first reference object,
    wherein configuring the UI at the display position for the UI with a parallax determined based on the individual parallax of the plurality of objects in the 3D display scene to correspond to at least one selected object from the plurality of objects further includes:

when an input object operates the UI in the 3D display scene, determining spatial coordinates of the input object operating the UI in the 3D display scene;

determining an object from the plurality of objects located at the spatial coordinates in the 3D display scene as the first reference object; and configuring the parallax of the UI as the same as the parallax of the first reference object such that the UI has the same display position and the same parallax as the first reference object.

2. The method according to claim 1, wherein configuring the UI at the display position for the UI with a parallax determined based on the individual parallax of the plurality of objects in the 3D display scene to correspond to at least one selected object from the plurality of objects further includes:

determining a maximum parallax among the individual parallax of the plurality of the objects in the 3D display scene, with an object having the maximum parallax as the first reference object; and configuring the parallax of the UI as the maximum parallax to display the UI at a farthest position from the user in the 3D display scene to cause least amount of impact when the 3D display scene changes.

3. The method according to claim 1, wherein configuring the UI at the display position for the UI with a parallax determined based on the individual parallax of the plurality of objects in the 3D display scene to correspond to at least one selected object from the plurality of objects further includes:

determining a minimum parallax among the individual parallax of the plurality of the objects in the 3D display scene, with an object having the minimum parallax as the first reference object; and configuring the parallax of the UI as the minimum parallax to display the UI at a closest position to the user.

4. The method according to claim 1, wherein:

the UI is displayed using a first display rule when the UI is not activated; and the UI is displayed using a second display rule, different from the first display rule, when the UI is activated.

5. The method according to claim 4, wherein:

the first display rule includes display formats not perceivable by human eyes; and the second display rule includes display formats perceivable by human eyes.

6. The method according to claim 4, wherein:

the second display rule includes displaying any one or more of a group of display parameters including measured temperature, date, time, location, user interaction, entered messages or advertisement, presentation media items, connection with an external device, communication with the external device, and an incoming telephone call.

7. The method according to claim 4, wherein:

the first display rule uses display formats including at least one of melting, dissolving, spraying, absorbing, boiling, exploding, burning, falling, flying down, flying away, fading, wind blowing, evaporating, submerging, erasing, and smearing; and the second display rule uses display formats including at least one of spraying, drawing, smoking, exploding, burning, raining, snowing, growing longer, growing taller, getting strong, and being punctured.

8. The method according to claim 1, further including:

changing the 3D image with a different 3D image for a different 3D display scene; and reconfiguring the parallax of the UI according to the changed 3D display scene.

9. A three-dimensional (3D) user interface (UI) display system, comprising:

a display configured to display as a 3D display scene a 3D image containing a plurality of objects and having at least a first image and a second image, the 3D display scene being formed by the plurality of objects; and a processor configured to:

determine a UI, independent and separate from the plurality of objects and for interacting with a user for inputting information, in the 3D display scene to be configured at a display position for the UI;

determine individual parallax of the plurality of the objects in the 3D display scene; and configure the UI at the display position for the UI with a parallax determined based on the individual parallax of the plurality of objects in the 3D display scene to correspond to at least one selected object from the plurality of objects, wherein, to configure the UI at the display position for the UI with a parallax determined based on the individual parallax of the plurality of objects in the 3D display scene to correspond to at least one selected object from the plurality of objects, the processor is further configured to:

determine the display position of the UI to be configured;

select a first reference object from the plurality of objects having a same position with the display position of the UI as the selected object; and configure the parallax of the UI as the same as the parallax of the first reference object such that the UI has the same display position and the same parallax as the first reference object, wherein, to configure the UI at the display position for the UI with a parallax determined based on the individual parallax of the plurality of objects in the 3D display scene to correspond to at least one selected object from the plurality of objects, the processor is further configured to:

when an input object operates the UI in the 3D display scene, determine spatial coordinates of the input object operating the UI in the 3D display scene;

determine an object from the plurality of objects located at the spatial coordinates in the 3D display scene as the first reference object; and configure parallax of the UI as the same as the parallax of the first reference object such that the UI has the same display position and the same parallax as the first reference object.

10. The display system according to claim 9, wherein, to configure the UI at the display position for the UI with a parallax determined based on the individual parallax of the plurality of objects in the 3D display scene to correspond to at least one selected object from the plurality of objects, the processor is further configured to:

determine a maximum parallax among the individual parallax of the plurality of the objects in the 3D display scene, with an object having the maximum parallax as the first reference object; and configure the parallax of the UI as the maximum parallax to display the UI at a farthest position from the user in the 3D display scene to cause least amount of impact when the 3D display scene changes.

11. The display system according to claim 9, wherein, to configure the UI at the display position for the UI with a parallax determined based on the individual parallax of the plurality of objects in the 3D display scene to correspond to at least one selected object from the plurality of objects, the processor is further configured to:
- determine a minimum parallax among the individual parallax of the plurality of the objects in the 3D display scene, with an object having the minimum parallax as the first reference object; and
- configure the parallax of the UI as the minimum parallax to display the UI at a closest position to the user.

12. The display system according to claim 9, wherein the processor is configured to:
- apply a first display rule for displaying the UI when the UI is not activated; and
- apply a second display rule, different from the first display rule, for displaying the UI when the UI is activated.

13. The display system according to claim 12, wherein:
- the first display rule includes display formats not perceivable by human eyes; and
- the second display rule includes display formats perceivable by human eyes.

14. The display system according to claim 12, wherein:
- the second display rule includes displaying any one or more of a group of display parameters including measured temperature, date, time, location, user interaction, entered messages or advertisement, presentation media items, connection with an external device, communication with the external device, and an incoming telephone call.

15. The display system according to claim 12, wherein:
- the first display rule uses display formats including at least one of melting, dissolving, spraying, absorbing, boiling, exploding, burning, falling, flying down, flying away, fading, wind blowing, evaporating, submerging, erasing, and smearing; and
- the second display rule uses display formats including at least one of spraying, drawing, smoking, exploding, burning, raining, snowing, growing longer, growing taller, getting strong, and being punctured.

* * * * *